United States Patent [19]

McIntyre

[11] Patent Number: 5,241,335
[45] Date of Patent: Aug. 31, 1993

[54] ZOOM CONTROL SYSTEM

[75] Inventor: Dale F. McIntyre, Mendon, N.Y.

[73] Assignee: Eastman Kodak Company, Rochester, N.Y.

[21] Appl. No.: 710,415

[22] Filed: Jun. 5, 1991

[51] Int. Cl.⁵ .............................................. G03B 1/18
[52] U.S. Cl. ................................. 354/195.12; 359/697
[58] Field of Search ............ 354/195.1, 195.11, 195.12, 354/400; 359/696, 697, 698

[56] References Cited

U.S. PATENT DOCUMENTS 3,209,367  9/1965  Heden ................................ 352/140
3,418,032 12/1968  Kajiro ................................ 359/422
4,445,757  5/1984  Enomoto et al. ............... 354/195.12
4,831,402  5/1989  Fujita et al. ......................... 354/400
4,935,763  6/1990  Itoh et al. ........................ 354/195.1

Primary Examiner—David M. Gray
Attorney, Agent, or Firm—David Hall

[57] ABSTRACT

A zoom control system for providing variable speed zoom control of a zoom lens system in a camera, or the like, comprises a single actuating means, timing control electronics, and speed control electronics. The zoom control system effects variable speed zooming in response to time dependent actuation of the zooming operation.

2 Claims, 5 Drawing Sheets

ZOOM CONTROL SYSTEM

BACKGROUND OF THE INVENTION

1. Field of the Invention

The present invention relates to zoom control systems and, more particularly, to a zoom lens control system for controlling the direction and speed of a zoom operation.

2. Description of the Related Art

Zooming devices generally include a switch commonly termed a zooming switch, which determines the shortening or lengthening of the focal distance according to the direction of zooming by means of a multiplying lens group. It is also known to include a second switch called a zooming speed switch for shifting the zooming speed. Use of both a zooming direction switch and a zooming speed stitch in a zooming device is disadvantageous since it requires multiple actuations by the zooming device operator.

In U.S. Pat. No. 4,445,757, a zooming device is proposed in which the direction and speed of zooming by means of a multiple lens group is achieved by use of a special rocker type switch. The rocker switch includes a plurality of successively operable switches and a flexible contact on each side of the center of rotation. The rocker can be turned in either direction to operate the first one of the plurality of switches so as to obtain a zooming operation in the corresponding direction and at a predetermined speed. The zooming speed can be changed to a next speed when a second one of the switches is operated by further turning of the rocker and flexing of the corresponding flexible contact. The '757 zooming device is disadvantageous and undesirable in a low cost zooming application since it requires the use of a special rocker switch which is mechanically complex and costly. A further disadvantage of the '757 zooming device is that the special rocker switch is unreliable in that it includes a flexible metal contact susceptible to metal fatigue and failure.

It would thus be desirable to provide a zoom control system that is simple, cost effective, and reliable.

OBJECTS OF THE INVENTION

An object of the present invention is to provide a simple zoom control system for effectuating a zoom operation.

Another object of the present invention is to provide a reliable zoom control system.

Still another object of the present invention is to provide a low cost zoom control system.

SUMMARY OF THE INVENTION

According to the invention, a zoom control system, to be embodied in a camera, or the like, having a zoom lens and a motor means for causing a zoom operation of the lens, controls the direction and speed of the zoom operation. The zoom control system comprises an actuating means for effecting the zoom operation of the lens. A timing means responsive to the actuating means times the duration of the zoom operation. A speed varying means responsive to the timing means varies the speed of zoom operation as a function of the duration of zoom operation.

DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DESCRIPTION OF THE PREFERRED EMBODIMENT

The invention is disclosed as being embodied preferably in a camera. The invention is equally applicable to other zooming devices, for example, binoculars. Because cameras are well known, this description is directed in particular to camera elements forming part of or cooperating directly with the disclosed embodiment. It is to be understood, however, that other camera elements not specifically shown or described may take various forms known to persons of ordinary skill in the art.

Figure 1:
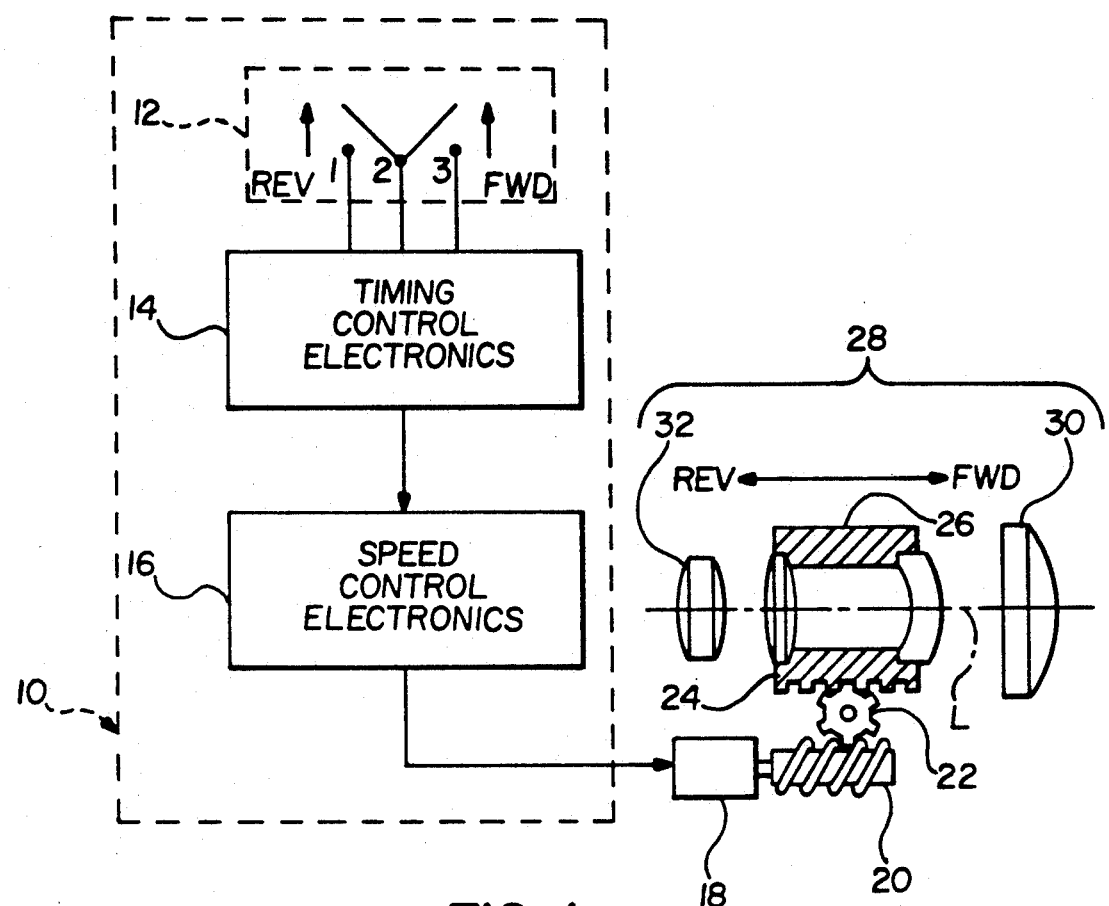
FIG. 1 is a schematic representation of a preferred embodiment of the present invention.

Referring now to FIG. 1, a zoom control system 10 comprises a zoom actuating means 12, timing control electronics 14, and speed control electronics 16. Actuating means 12 can be a commercially available 3 position changeover centre-off switch having one normally open (POS. 2) and two momentary closed (POS. 1 and 3) positions. Actuating means 12 can be, for example, a rocker switch. Position 1 (POS.1) of actuating means 12 is one of the momentary positions and is representative of a REVERSE direction. Position 3 (POS.3) is the other momentary position and is representative of a FORWARD direction. Actuating means 12 is connected to timing control electronics 14. Timing control electronics 14 can comprise for example discrete timing circuitry, a microprocessor, or a microcomputer. Since control electronics employed in recent cameras include microprocessors and microcomputers, timing control electronics 14, and thus zoom control system 10, would not add significant cost to the overall device. Timing control electronics 14 is also reliable. Programming of a microprocessor or a microcomputer are well known in the art and therefore not discussed herein. Likewise, discrete timing circuitry can be implemented via Programmable Array Logic (PAL), well known in the art, and therefore not discussed herein.

Timing control electronics 14 is connected to speed control electronics 16. Speed control electronics 16 comprises driver circuitry and is electrically connected to zoom motor 18. The driver circuitry of speed control electronics 16 can comprise, for example, an H-drive circuit, which is well known in the art, for varying the amount and direction of current in motor 18. Motor 18 is coupled to a worm gear 20, which is in turn coupled to a pinion gear 22. Pinion gear 22 is in mesh with a rack gear 24 which is secured to a multiple lens group 26. Lens group 26 constitutes part of a zoom lens 28. The zoom lens 28 includes front and rear lens groups 30 and 32, which are coaxial on an optical axis L and are disposed on the front and rear sides respectively of the multiple lens group 26.

Figure 2:
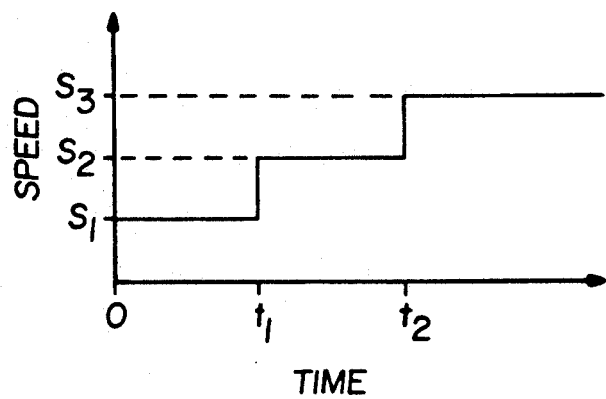
FIG. 2 is a graph of speed vs time of the zoom control system according to the preferred embodiment.

In operation, referring now to FIGS. 1 and 2, the zoom control system 10 provides variable speed zooming in either a forward (FWD) or reverse (REV) direction. To effect a variable speed zooming operation in the forward direction, a system user causes actuating means 12 to be in POS.3 or the forward position. Upon actuation of actuating means 12, timing control electronics 14 begins timing the duration of the zooming operation and speed control electronics 16 drives zoom motor 18 at a first predetermined speed $S_1$. Upon continued actuation of actuating means 12 and the expiration of a first predetermined time $t_1$, speed control electronics 16 drives motor 18 at a second predetermined speed $S_2$. Upon further continued actuation of actuating means 12 and the expiration of a second predetermined time $t_2$, speed control electronics 16 drives motor 18 at a third predetermined speed $S_3$. Timing control electronics 14 monitors the duration of the zooming operation so long as actuating means 12 is actuated. Upon release of actuating means 12, timing electronics 14 stops timing the zooming operation, speed control electronics 16 stops driving motor 18, and the zooming operation is terminated. Should the system user desire a variable speed zooming operation in the reverse direction, actuating means 12 is placed in POS.1 and variable speed zooming occurs as described above.

Figure 3A:
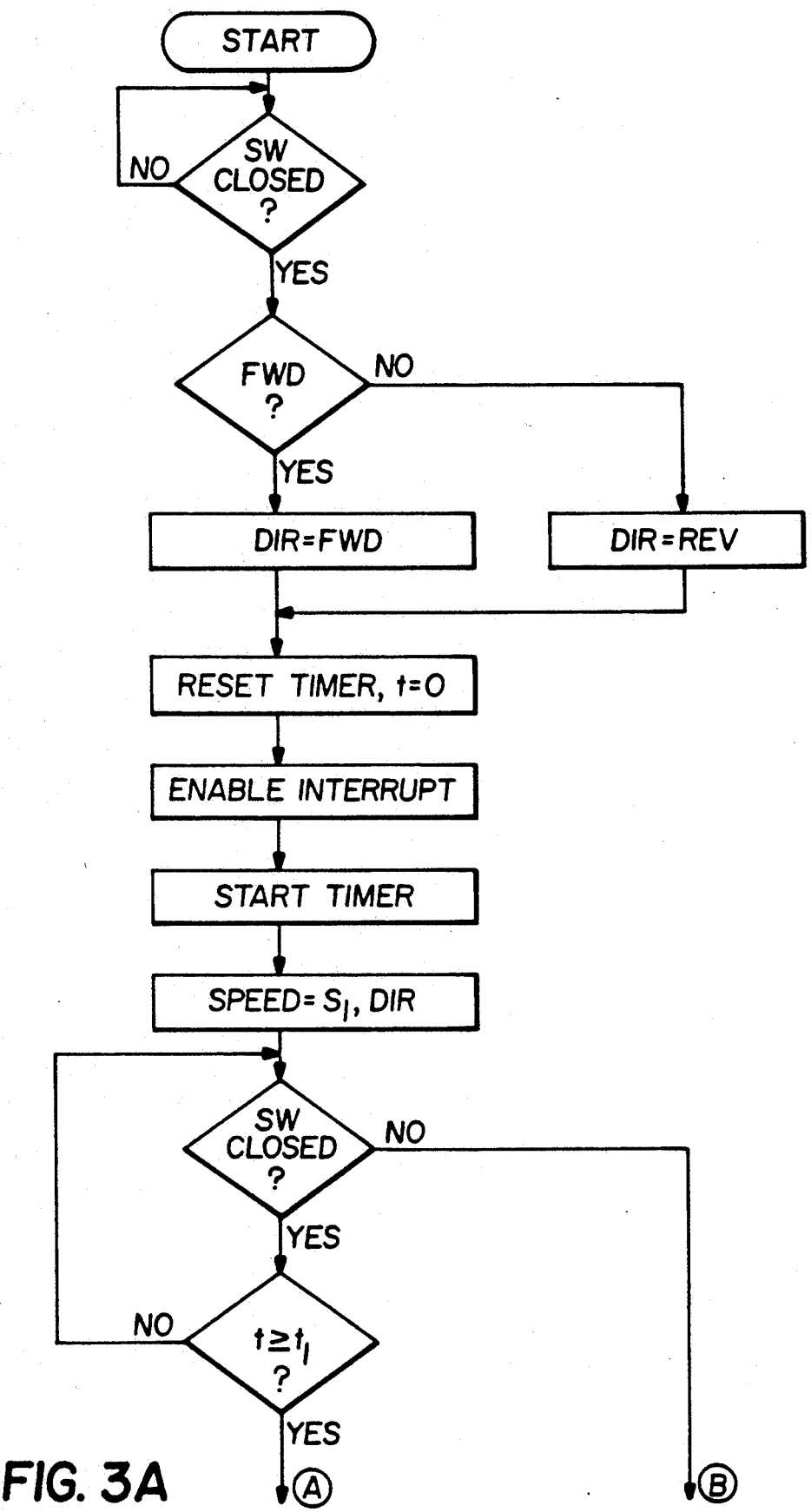
FIGS. 3A and 3B is a flow chart depicting operation of the preferred embodiment.
Figure 3B:
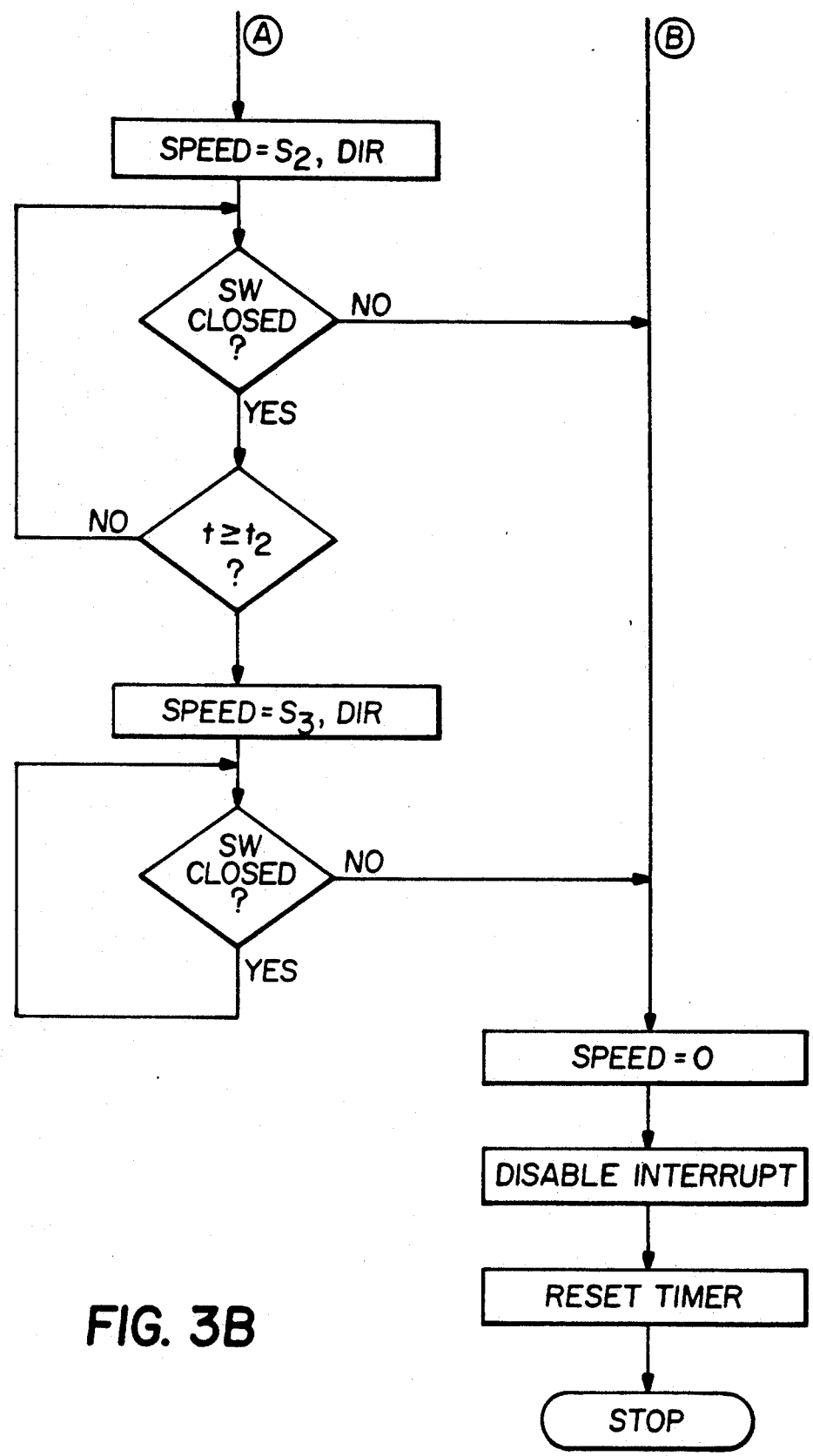

FIGS. 3A and 3B are a flow chart depicting operation of zoom control system 10. To begin, timing control electronics 14 checks to see if the actuation means 12 switch has been closed. If closed, timing control electronics determines which zooming direction is desired, i.e. forward or reverse. Timing control electronics 14 then initializes a timer and begins timing the duration of the zooming operation. Upon the starting of the timer, the speed control electronics 16 drives zoom motor 18 at a first predetermined speed $S_1$ in the desired direction. Upon timing control electronics 14 detecting the expiration of a first predetermined time $t_1$, speed control electronics 16 then drives zoom motor 18 at a second predetermined speed $S_2$ in the desired direction. Upon timing control electronics 14 detecting the expiration of a second predetermined time $t_2$, speed control electronics 16 then drives zoom motor 18 at a third predetermined speed $S_3$. In this example, the first, second, and third predetermined speeds $S_1$, $S_2$, and $S_3$ are in increasing order, respectively. If at any time, the actuation means 12 switch is opened, the zooming operation is terminated and the zoom motor 18 is braked (i.e., the speed is zero).

Figure 4:
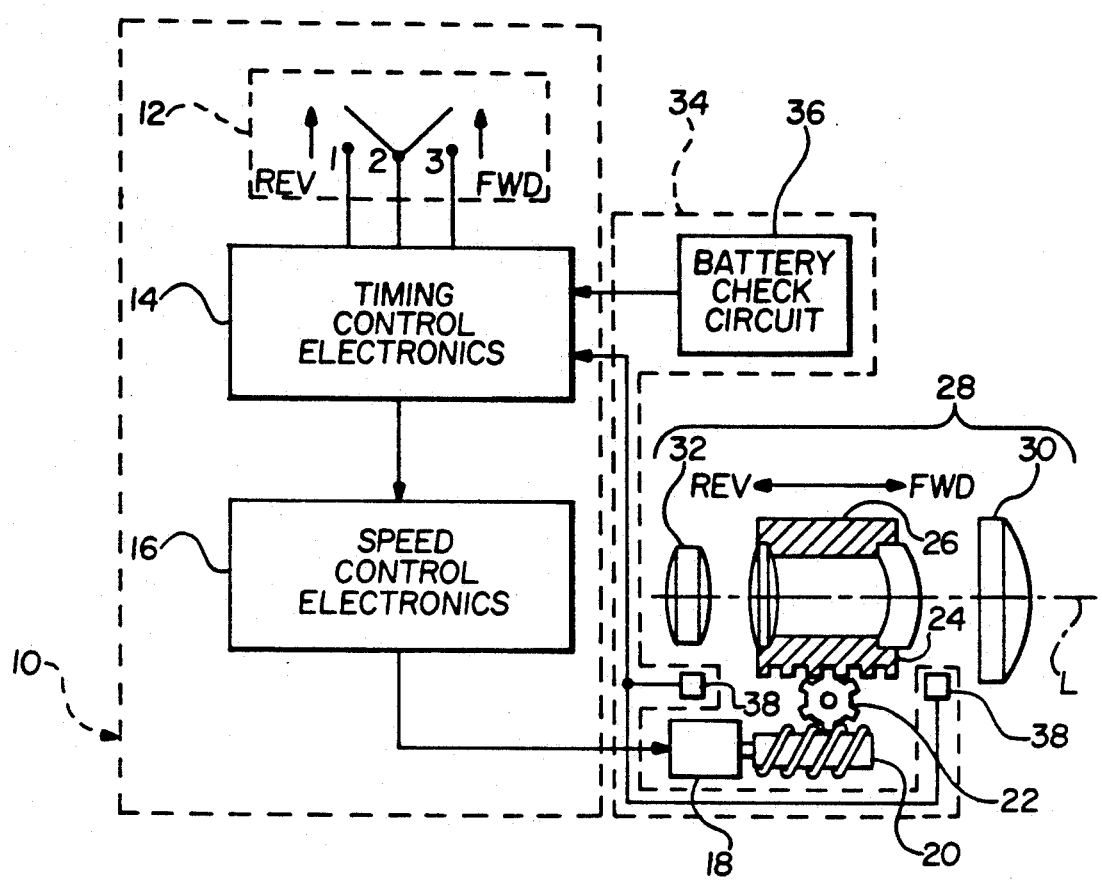
FIG. 4 is a schematic representation of yet another embodiment of the present invention.

Referring now to FIG. 4, an alternate embodiment of the present invention further includes a system condition indication means 34 comprising, for example, a battery check circuit 36 and a zoom lens position detection means 38. System condition indication means 34 provides an indication signal when a particular system condition exists. Examples of system conditions are low battery voltage and zoom lens end-of-travel positions. Upon indication of a system condition, timing control electronics 14 causes speed control electronics to drive motor 18 at a fourth predetermined speed, $S_4$. Speed $S_4$ can be equal to the speed $S_1$ or slower.

Figure 5:
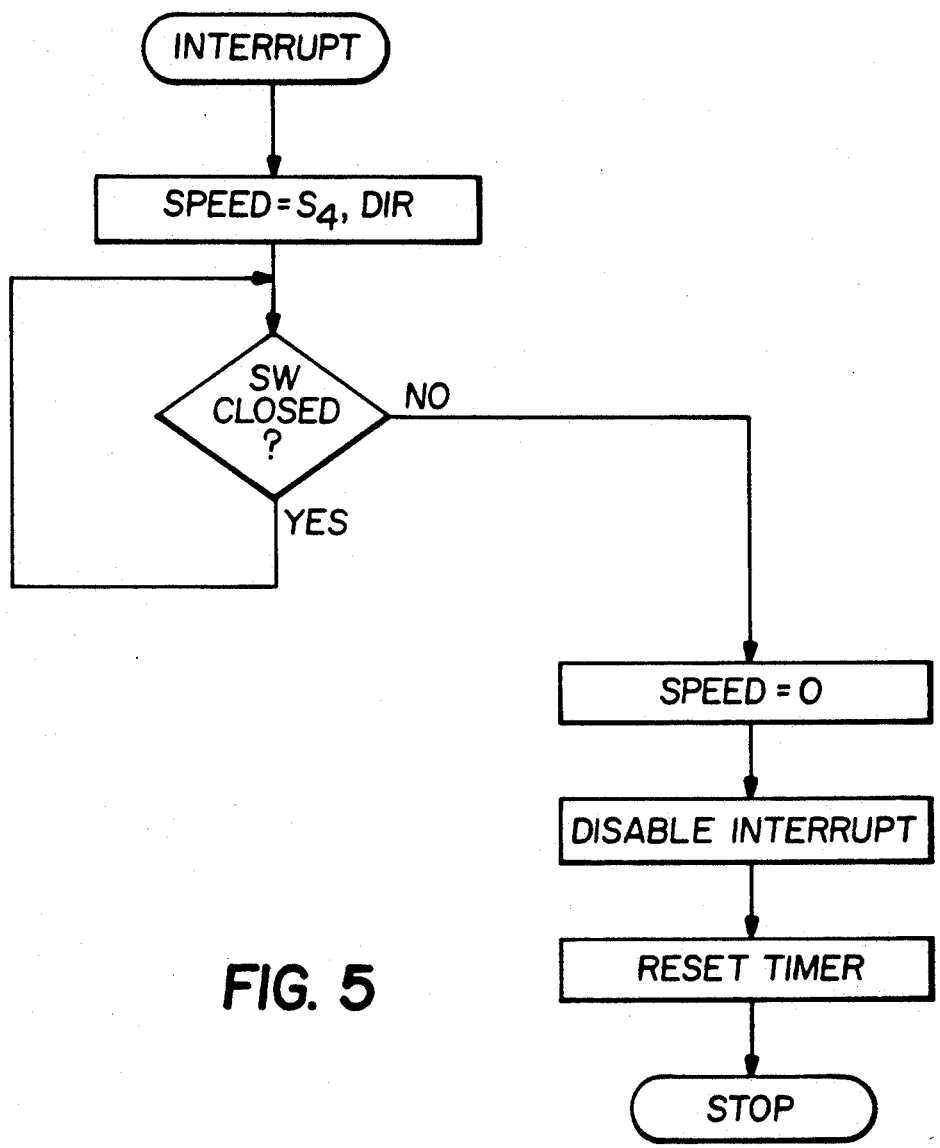
FIG. 5 is a flow chart depicting operation of an alternate embodiment.

In operation, the zoom control system 10 of the alternate embodiment operates similarly to the preferred embodiment with the following differences. Upon detection of a system condition, for example, a low battery voltage, system condition indication means 34 causes an interrupt to occur. Upon the occurrence of the interrupt, speed control electronics 16 drives zoom motor 18 at the fourth predetermined speed, $S_4$, in the previously chosen direction. An interrupt routine is shown in FIG. 5. Alternatively, if the system condition indication means 34 indicates a zoom lens near end-of-travel position, the interrupt routine could be arranged so as to cause speed control electronics 16 to continuously decrease the zooming speed from a predetermined speed to zero, at which point an absolute end-of-travel zoom lens position is achieved.

Figure 6:
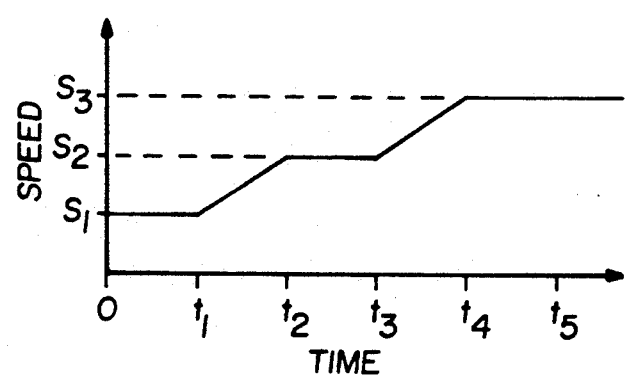
FIG. 6 is a graph of speed vs time of the zoom control system according to a yet another embodiment of the invention.

In yet another alternate embodiment, upon expiration of a first predetermined time, $t_1$, speed control electronics 16 drives motor 18 to accelerate from speed $S_1$ to $S_2$. Upon expiration of a second predetermined time, $t_2$, speed control electronics 16 drives motor 18 at the second predetermined speed $S_2$, and so on. See FIG. 6.

Accordingly, it has been shown that the single actuating means 12, timing control electronics 14, and speed control electronics 16 provide a simple, reliable, and low cost variable speed zoom control of a zoom lens system. Variable speed zooming occurs in response to time dependent actuation of a zooming operation.

While the invention has been described with reference to the preferred and alternate embodiments, it will be appreciated that variations and modifications can be effected within the spirit and scope of the invention. For example, time control electronics 14 and speed control electronics 16 could be integrated on one integrated circuit chip according to the requirements of a particular zoom system.

What is claimed is:

1. A zoom control system for a camera, or the like, adapted to be provided with a zoom lens and having motor means for causing a zoom operation of said lens, said system comprising:

actuating means for effecting zoom operation of said lens;

timing means responsive to said actuation means for timing the duration of said zoom operation;

speed varying means responsive to the timing means for varying the speed of zoom operation as a function of the duration of zoom operation; and indicating means for indicating a system condition, wherein said speed varying means further being responsive to said indicating means for overriding said timing means and for varying the speed of zoom operation as a function of the system condition;

wherein said indicating means includes a means for generating a battery low signal at a predetermined battery voltage and said speed varying means changes said zoom from one to another zoom speed in response to said battery low signal.

2. The zoom control system of claim 1 in which said speed varying means is operative to decrease said zoom speed in response to said battery low signal.

* * * * *